United States Patent
Rezaiifar et al.

(10) Patent No.: US 8,761,713 B2
(45) Date of Patent: Jun. 24, 2014

(54) METHOD AND APPARATUS FOR EMERGENCY BROADCAST USING AN EMERGENCY BROADCAST-MULTICAST SERVICE

(75) Inventors: Ramin Rezaiifar, San Diego, CA (US); Rashid A. Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1038 days.

(21) Appl. No.: 12/023,857

(22) Filed: Jan. 31, 2008

(65) Prior Publication Data

US 2008/0227428 A1  Sep. 18, 2008

Related U.S. Application Data (60) Provisional application No. 60/888,022, filed on Feb. 2, 2007.

(51) Int. Cl.
*H04M 11/04* (2006.01)

(52) U.S. Cl.
USPC .................. 455/404.1; 455/414.1; 455/414.3; 455/418; 455/422.1; 455/434; 455/521; 370/310; 370/310.2; 370/322; 370/328

(58) Field of Classification Search
USPC ........ 455/404.1, 414.1, 418, 422.1, 434, 521; 370/310, 310.2, 322, 328
See application file for complete search history.

(56) References Cited

U.S. PATENT DOCUMENTS

| | | | |
|---|---|---|---|
| 5,870,673 A | 2/1999 | Haartsen | |
| 5,878,038 A * | 3/1999 | Willey | 370/335 |
| 6,157,815 A | 12/2000 | Collins et al. | |
| 6,161,016 A | 12/2000 | Yarwood | |
| 7,844,286 B1 * | 11/2010 | Sennett et al. | 455/466 |
| 2004/0180655 A1 | 9/2004 | Jang et al. | |
| 2005/0037728 A1 | 2/2005 | Binzel et al. | |
| 2006/0029011 A1 | 2/2006 | Etemad et al. | |
| 2006/0039307 A1 | 2/2006 | Seo et al. | |

FOREIGN PATENT DOCUMENTS

| | | |
|---|---|---|
| JP | 2001197021 A | 7/2001 |
| JP | 2007028633 A | 2/2007 |
| JP | 2007516657 A | 6/2007 |
| JP | 2007527652 | 9/2007 |
| RU | 2157598 | 10/2000 |
| RU | 2006107541 A | 7/2006 |

(Continued)

OTHER PUBLICATIONS

International Search Report—PCT/US2008/052898, International Search Authority—European Patent Office—Jul. 18, 2008.

(Continued)

*Primary Examiner* — Steve D Agosta
(74) *Attorney, Agent, or Firm* — John J. Ketchum (57) ABSTRACT

Methods, apparatus and media for receiving emergency broadcast information in a broadcast-multicast service of a communication system. The methods, apparatus and media include scheduling a broadcast of emergency broadcast information in designated control channel cycles for designated subscriber stations. The control channel cycles are transmitted with the designated control channel cycles including the emergency broadcast information. Subscriber stations awake according to their designated control channel cycle and receive the transmission of their designated control channel cycle on a broadcast-multicast service. The subscriber station determines if emergency broadcast information is in the control channel cycle assigned to the subscriber station and responds accordingly.

21 Claims, 8 Drawing Sheets

(56) References Cited

FOREIGN PATENT DOCUMENTS

| | | |
|---|---|---|
| TW | 530502 B | 5/2003 |
| WO | WO9610895 A1 | 4/1996 |
| WO | WO9810605 A1 | 3/1998 |
| WO | WO9838757 A1 | 9/1998 |
| WO | 0197545 | 12/2001 |
| WO | WO03010900 A1 | 2/2003 |
| WO | WO03096580 A2 | 11/2003 |
| WO | 2005029762 | 3/2005 |
| WO | WO2005020593 | 3/2005 |
| WO | WO2006096854 A2 | 9/2006 |
| WO | WO2008097894 | 8/2008 |

OTHER PUBLICATIONS

Written Opinion—PCT/US2008/052898, International Search Authority—European Patent Office—Jul. 18, 2008.
Taiwan Search Report—TW097104450—TIPO—Jun. 14, 2011.
European Search Report—EP11192310—Search Authority—Munich—Feb. 20, 2012.

* cited by examiner

METHOD AND APPARATUS FOR EMERGENCY BROADCAST USING AN EMERGENCY BROADCAST-MULTICAST SERVICE

CLAIM OF PRIORITY UNDER 35 U.S.C. §120

The present Application for patent claims priority from U.S. Provisional Application No. 60/888,022, filed Feb. 2, 2007, assigned to the assignee hereof and hereby expressly incorporated by reference herein.

BACKGROUND

1. Field

The present invention relates generally to emergency broadcasting and, more particularly, to methods and apparatus for sending emergency broadcast information to remote terminals.

2. Background

Communication systems may use a single carrier frequency or multiple carrier frequencies. Generally in wireless communication systems, a channel consists of a forward link (FL) for transmissions from an access network (AN) to an access terminal (AT) and a reverse link (RL) for transmissions from the access terminal (AT) to the access network (AN). The access terminal (AT) is also commonly known as a remote station, a mobile station or a subscriber station and may be mobile or stationary. Each forward or reverse link may incorporate a different number of carrier frequencies.

Modern communications systems are designed to allow multiple users to access a common communications medium. Numerous multiple-access techniques are known in the art, such as time division multiple-access (TDMA), frequency division multiple-access (FDMA), space division multiple-access, polarization division multiple-access, code division multiple-access (CDMA), and other similar multi-access techniques. The multiple-access concept is a channel allocation methodology that allows multiple user access to a common communications link. The channel allocations can take on various forms depending on the specific multi-access technique. By way of example, in FDMA systems, the total frequency spectrum is divided into a number of smaller sub-bands and each user is given its own sub-band to access the communications link. Alternatively, in TDMA systems, each user is given the entire frequency spectrum during periodically recurring time slots. In CDMA systems, each user is given the entire frequency spectrum for all of the time but distinguishes its transmission through the use of a code.

Communication systems have also incorporated broadcast services. For example, Broadcast-multicast services (BC-MCS) provide point-to-multipoint communication service in a wireless communication system to a plurality of subscriber stations that receive broadcast data through a wireless communication medium. The broadcast data (i.e., content) transmitted by the wireless communication system to the plurality of subscriber stations may include, but need not necessarily be limited to, news, movies, sporting events, and the like. The specific type of content transmitted to the subscriber stations may include a wide array of multi-media data, such as text, audio, picture, streaming video, etc. The content is typically generated by a content provider and is broadcast to the subscriber stations that subscribe to the particular service over a broadcast channel of the wireless communication system.

As subscriber stations have become far more functional than providing mere one-to-one voice communication, there is a need to provide broadcast notifications, such as emergency information, to subscribers. While emergency notifications may require a finite amount of resources, there is a need to provide an emergency notification service that does not consume significant power in order to vigilantly monitor for emergency notifications.

SUMMARY

The various embodiments of the present invention describe methods, apparatus and media for receiving emergency broadcast information in a broadcast-multicast service of a communications system. The methods, apparatus and media include scheduling broadcast of emergency broadcast information in designated control channel cycles for specific subscriber stations. The control channel cycles are transmitted and include any emergency broadcast information. Subscriber stations awake according to their designated control channel cycle and receive the transmission of their designated control channel cycle within a paging cycle in the broadcast-multicast service. The subscriber station determines if emergency broadcast information appears in the control channel cycle assigned to the subscriber station and responds accordingly.

In various embodiments, a method and means for receiving broadcast information at a subscriber station are disclosed. The method and means include determining if emergency broadcast information appears in a control channel cycle of a broadcast-multicast service assigned to the subscriber station. When the emergency broadcast information is present in the control channel cycle, then the method presents the emergency broadcast information to a subscriber station user.

In another embodiment, a subscriber station for receiving emergency broadcast information is disclosed. The subscriber station includes receive circuitry configured to receive a transmission of a control channel cycle in a broadcast-multicast service. The subscriber station further includes a processor unit operably coupled to the receive circuitry wherein the processor unit is configured to determine if emergency broadcast information appears in the control channel cycle assigned to the subscriber station.

In a further embodiment, an access network for broadcasting emergency broadcast information is disclosed. The access network includes a broadcast-multicast service controller configured to support a broadcast-multicast service and further configured to schedule broadcasting emergency broadcast information in designated control channel cycles for designated subscriber stations. The access network further includes a base station operably coupled to the broadcast-multicast service controller wherein the base station is configured to transmit a transmission of the designated control channel cycles on the broadcast-multicast service wherein at least one of the designated control channel cycles includes the emergency broadcast information therein.

In yet a further embodiment, a method for receiving emergency broadcast information at a subscriber station is disclosed. The method includes periodically waking-up to check at least one control channel cycle of a broadcast service and checking at least one slot of the control channel cycle during the wake-up for emergency broadcast information. The method further includes computing a short-term key from a random number and a broadcast access key and decrypting the broadcast information when present in the at least one slot of the control channel cycle.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well known structures and devices are shown in block diagram form in order to avoid obscuring the concepts of the present invention.

Figure 1A:
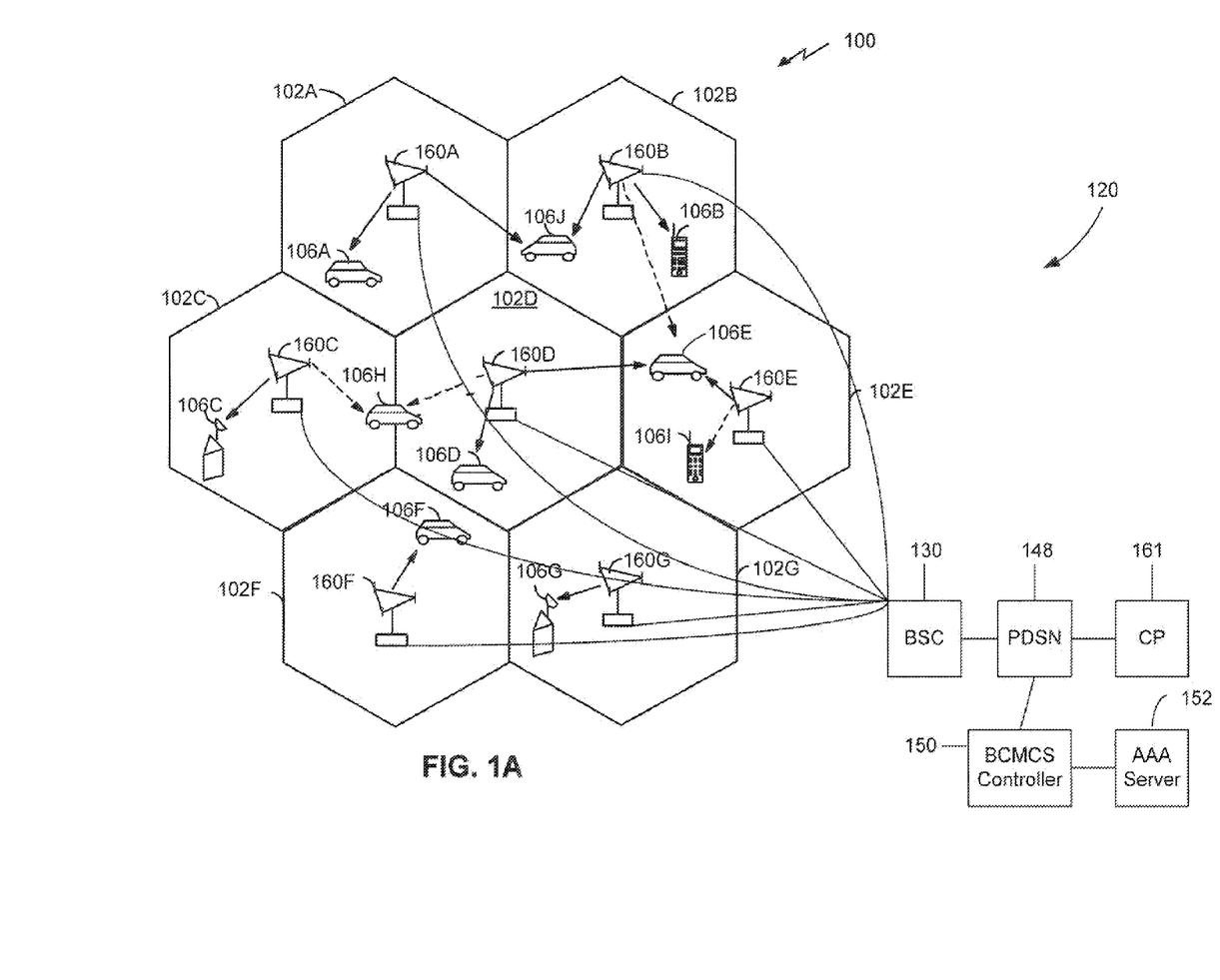
FIG. 1A is a diagram of a wireless communication system, in accordance with an embodiment of the present invention.
Figure 1B:
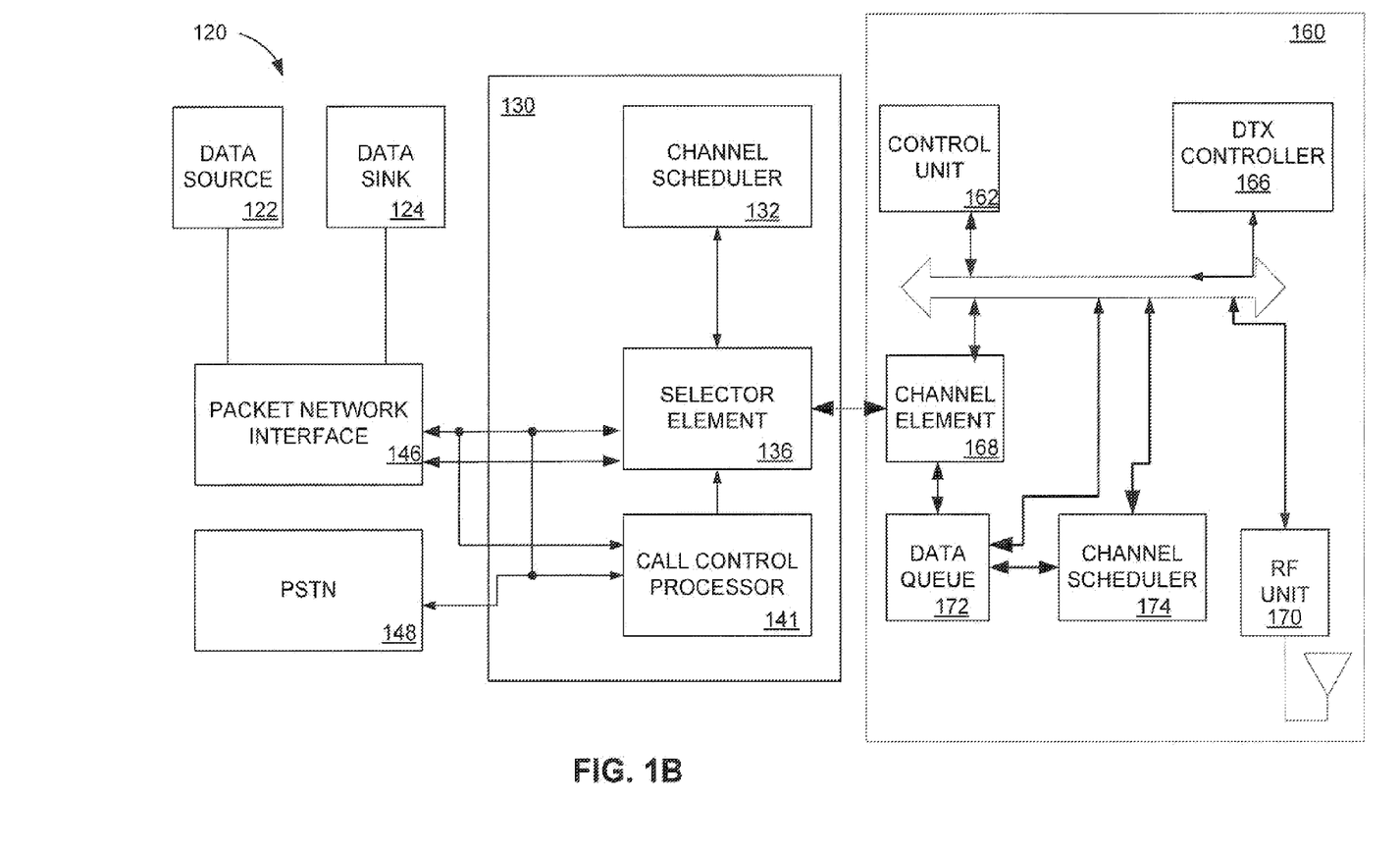
FIG. 1B is a portion of a communication system, including a base station controller and a base station, in accordance with an embodiment of the present invention.

An example of a wireless communication system 100 is shown in FIG. 1A and a simplified functional block diagram of a wireless communications system is shown in FIG. 1B wherein reference numerals 102A-102G refer to cells, reference numerals 160A-160G refer to base stations and reference numerals 106A-106G refer to access terminals (AT) hereinafter called subscriber stations 106. Furthermore, a subscriber station may be any data device that communicates through a wireless channel or through a wired channel, for example using fiber optic or coaxial cables. A subscriber station may further be any of a number of types of devices including, but not limited to, a PC card, compact flash, external or internal modem, or wireless or wireline phone.

A reference model for a communication system may include an access network (AN) 120 in communication with a subscriber station 106 via an air interface. A subscriber station 106 transmits and receives data packets through one or more modem pool transceivers, referred to hereinafter as base stations 160, to a base station controller 130, also referred to herein as a modem pool controller (MPC), by way of the air interface. The access network (AN) 120 communicates with subscriber station 106, as well as any other subscriber stations 106 within system, by way of the air interface. As stated, the communication link through which the subscriber station 106 sends signals to the base station 160 is called the reverse link (RL) and the communication link through which a base station 160 sends signals to a subscriber station 106 is called a forward link (FL). Base stations 160 and base station controllers 130 are parts of an access network (AN) 120.

The access network (AN) 120 includes multiple sectors, wherein each sector provides at least one channel. A channel is defined as the set of communication links for transmissions between the access network (AN) 120 and the subscriber stations 106 within a given frequency assignment. A channel consists of a forward link (FL) for transmissions from the access network (AN) 120 to the subscriber station 106 and a reverse link (RL) for transmissions from the subscriber station 106 to the access network (AN) 120. The access network (AN) 120 may be further connected to additional networks outside the access network (AN) 120, such as a corporate intranet or the Internet, and may transport data packets between each subscriber station 106 and such outside networks 104. A subscriber station 106 that has established an active traffic channel connection with one or more base stations 160 is called an active subscriber station 106, and is said to be in a traffic state. A subscriber station 106 that is in the process of establishing an active traffic channel connection with one or more base stations 160 is said to be in a connection setup state.

As stated above, FIG. 1B is a simplified functional block diagram of a portion of a communications system. Accordingly, a base station controller 130 can be used to provide an interface between a network 120 and all base stations 160 dispersed throughout a geographic region. For ease of explanation, only one base station 160 is shown. The geographic region is generally subdivided into smaller regions known as cells 102. Each base station 160 is configured to serve all subscriber stations 106 in its respective cell. In some high traffic applications, the cell 102 may be divided into sectors with a base station 160 serving each sector. As illustrated, subscriber stations 106 are shown in communication with the base stations 160. Each subscriber station 106 may access the access network (AN) 120 for communicating with other subscriber stations 106 through one or base stations 160 under control of the base station controller 130 or for communicating with a network external to the access network (AN) 120.

In one example, the base station controller 130 in FIG. 1A is coupled to a packet data serving node (PDSN) 148 via a Packet Control Function (PCF) for interfacing the wireless communication system 100 to a content provider (CP) 161 via an Internet Protocol (IP) medium (not shown). The PDSN 148 processes the data packets for distribution to the subscriber stations 106 under the control of a broadcast-multicast services (BCMCS) controller 150, which may or may not have a direct connection to the PDSN 148. The BCMCS controller 150 schedules the broadcasting and multicasting of content provided by the content provider (CP) 161 and performs security functions for the broadcast-multicast service.

For BCMCS service, the base station 160 receives the stream of information from the PDSN 148 and provides the information on a designated wireless communication link to the predetermined group of subscriber stations 106 communicating within the wireless communication system 100. The BCMCS controller 150 may further be coupled to an Authentication, Authorization, and Accounting (AAA) server 152, which provides authentication, authorization, and accounting for the plurality of subscriber stations 106 of the wireless communication system 100 that subscribe to the broadcast-multicast service. The AAA server 152 may be implemented as a third-party server that is owned by neither the home network carrier nor the serving network carrier of the subscriber station 106.

The content provider (CP) 161 generates the content to be broadcast from the base stations 160 to the predetermined group of subscriber stations 106 that are authorized to receive the specific type of content. The content provider (CP) 161 may be implemented as a third-party content source that is owned by neither the home network carrier nor the serving network carrier of the subscriber station 106.

One example of a communication system supporting High Data Rate (HDR) transmissions and adapted for scheduling transmissions to multiple users is illustrated in FIG. 1B. FIG. 1B is detailed hereinbelow, wherein specifically, a base station 160 and base station controller 130 interface with a packet network interface 146. Base station controller 130 includes a channel scheduler 132 for implementing a scheduling algorithm for transmissions in system 120. The channel scheduler 132 determines the length of a service interval during which data is to be transmitted to any particular subscriber station 106 based upon the subscriber station's associated instantaneous rate for receiving data (as indicated in the most recently received Data Rate Control (DRC) signal).

Figure 2:
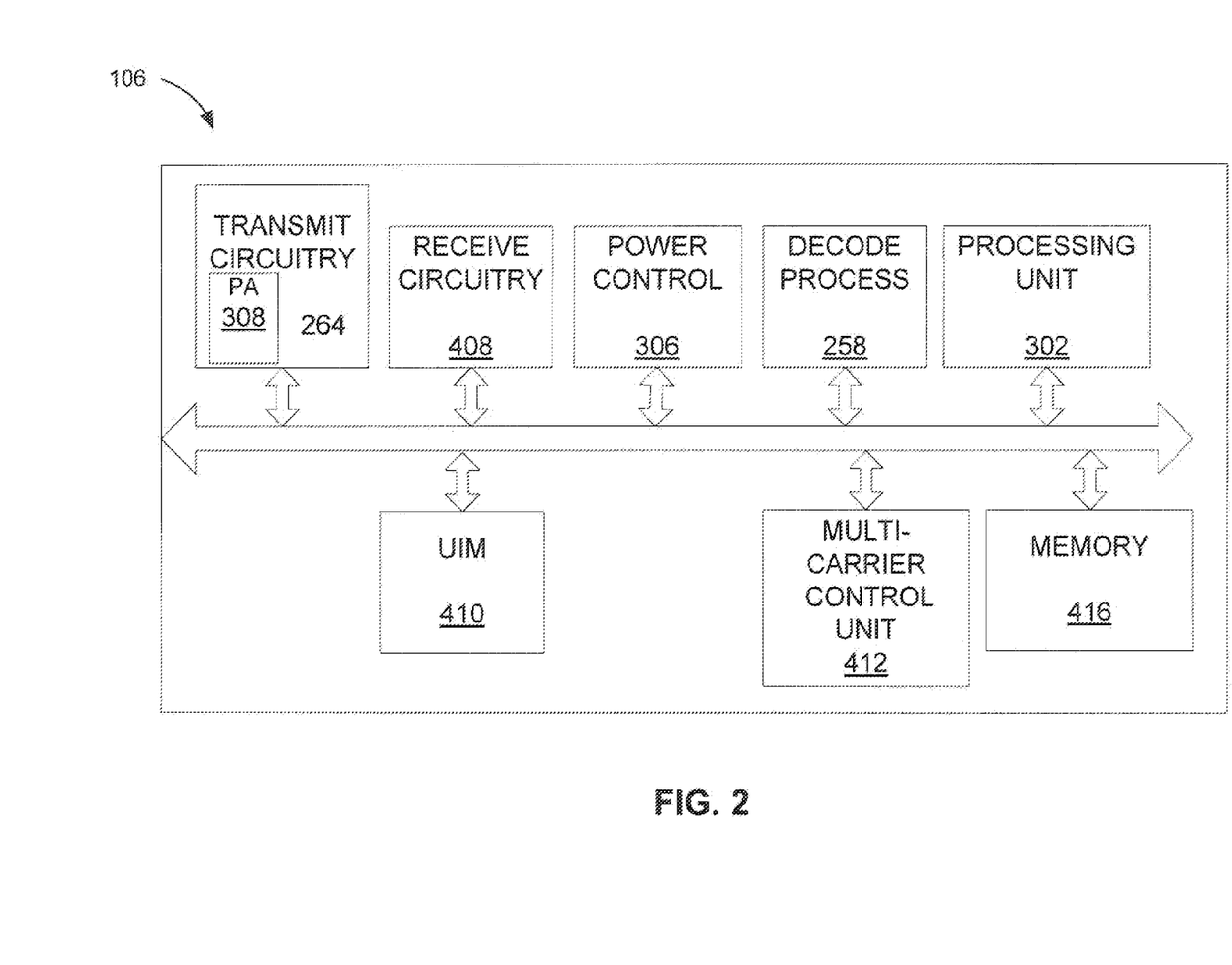
FIG. 2 is illustrates a block diagram of a subscriber station, in accordance with an embodiment of the present invention.

FIG. 2 illustrates an embodiment of a subscriber station 106 in which the subscriber station 106 includes transmit circuitry 264 (including Power Amplifier (PA) 308), receive circuitry 408, power control 306, decode process unit 258, processing unit 302, multi-carrier control unit 412 and memory 416. The subscriber station 106 is further configured with a user identification module (UIM) 410. In one embodiment, the UIM 410 may be a removable memory module coupled to the processing unit 302 of the subscriber station 106. It will be appreciated, however, that the UIM 410 could alternatively be implemented as a fixed part of the subscriber station 106. The UIM 410 is generally associated with a particular user of the subscriber station 106, and is used to verify that the particular user of the subscriber station 106 is entitled to the privileges afforded to that particular user, such as access to the wireless communication system 100, particular services/features provided by the wireless communication system 100, and/or access to particular content subscribed to through the BCMCS service.

Figure 3:
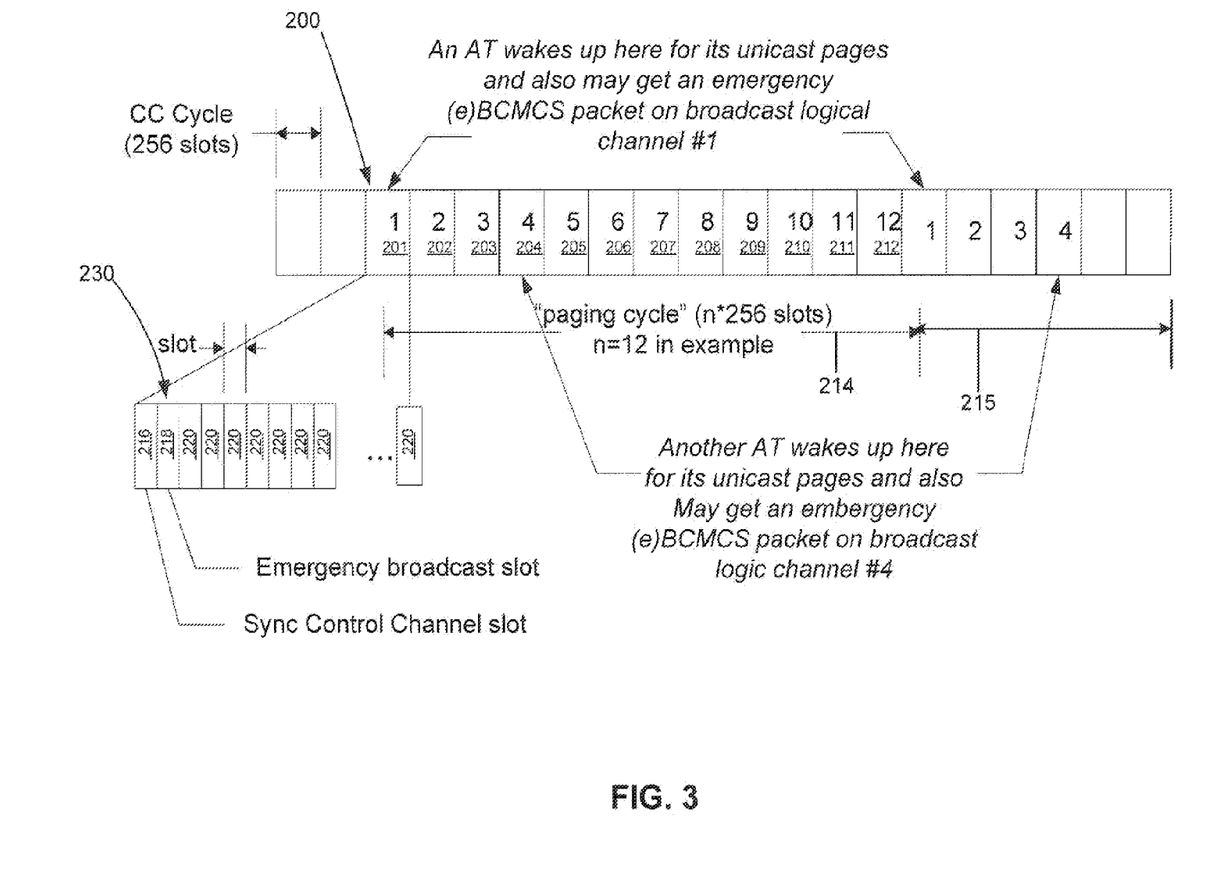
FIG. 3 illustrates a paging cycle including control channel cycles for implementing an emergency broadcast service, in accordance with an embodiment of the present invention.

As illustrated in FIG. 3, the service interval may not be contiguous in time but may occur once every "n" slots. According to one embodiment, the first portion of a packet is transmitted during a first slot at a first time and the second portion is transmitted, for example, four slots later at a subsequent time. Also, any subsequent portions of the packet are transmitted in multiple slots having a similar four slot spread, i.e., four slots apart from each other. According to an embodiment, the instantaneous rate of receiving data, $R_i$, determines the service interval length, $L_i$, associated with a particular data queue.

In addition, the channel scheduler 174 selects the particular data queue for transmission. The associated quantity of data to be transmitted is then retrieved from a data queue 172 and provided to the channel element 168 for transmission to the remote station associated with the data queue 172. As discussed below, the channel scheduler 174 selects the queue for providing the data, which is transmitted in a following service interval using information including the weight associated with each of the queues. The weight associated with the transmitted queue is then updated.

Base station controller 130 interfaces with packet network interface 146, Public Switched Telephone Network, Public Switched Telephone Network (PSTN) 148, and all base stations in the communication system (only one base station 160 is shown in FIG. 1B for simplicity). Base station controller 130 coordinates the communication between subscriber stations in the communication system and other users connected to packet network interface 146 and PSTN 148. PSTN 148 interfaces with users through a standard telephone network (not shown in FIG. 1B).

Base station controller 130 contains many selector elements 136, although only one is shown in FIG. 1B for simplicity. Each selector element 136 is assigned to control communication between one or more base stations 160 and one subscriber station 106. If selector element 136 has not been assigned to a given subscriber station, call control processor 141 is informed of the need to page the subscriber station. Call control processor 141 then directs base station 160 to page the subscriber station.

Data source 122 contains a quantity of data, which is to be transmitted to a given subscriber station. Data source 122 provides the data to packet network interface 146. Packet network interface 146 receives the data from data source 122 and routes the data to the selector element 136. Selector element 136 then transmits the data to each base station 160 in communication with the target subscriber station 106. In the exemplary embodiment, each base station 160 maintains a data queue 172, which stores the data to be transmitted to the subscriber station 106.

The data is transmitted under the control of control unit 162 and DTX controller 166 in data packets from data queue 172 to channel element 168. In the exemplary embodiment, on the forward link (FL), a "data packet" refers to a quantity of data which, or example, is a maximum of 1024 bits and a quantity of data to be transmitted to a destination remote station within a predetermined "time slot" (such as≈1.667 msec). For each data packet, channel element 168 inserts the necessary control fields. In the exemplary embodiment, channel element 168 performs a Cyclic Redundancy Check (CRC), encoding of the data packet and control fields and inserts a set of code tail bits. The data packet, control fields, CRC parity bits, and code tail bits comprise a formatted packet. In the exemplary embodiment, channel element 168 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 170, which quadrature modulates, filters, and amplifies the signal. The forward link signal is transmitted over the air through an antenna on the forward link (FL).

At the subscriber station 106, the forward link (FL) signal is received by an antenna and routed to a receiver. The receiver filters, amplifies, quadrature demodulates, and quantizes the signal. The digitized signal is provided to a demodulator (DEMOD) where it is despread with the short PNI and PNQ codes and decovered with the Walsh cover. The demodulated data is provided to a decoder which performs the inverse of the signal processing functions done at base station 160, specifically the de-interleaving, decoding, and CRC check functions. The decoded data is provided to a data sink 124.

The DRC signal transmitted by each subscriber station 106 travels through a reverse link (RL) channel and is received at base station 160 through a receive antenna coupled to RF unit 170. In the exemplary embodiment, the DRC information is demodulated in channel element 168 and provided to a channel scheduler 132 located in the base station controller 130 or to a channel scheduler 174 located in the base station 160. In a first exemplary embodiment, the channel scheduler 174 is located in the base station 160. In an alternate embodiment, the channel scheduler 132 is located in the base station controller 130, and connects to all selector elements 136 within the base station controller 130.

A broadcast short message service (SMS) (in IS-95/IS-2000) may be used for emergency broadcast. The network can notify the subscriber station 106 of the unscheduled program via several different ways, for example, via broadcast short message services (SMS), or an overhead message. An originating station, such as a base station, notifies a destination station, such as a subscriber station, that such an emergency broadcast will take place via SMS. This notification may also contain the program start time. However, there may be disadvantages to doing so. One disadvantage is that emergency broadcasting using SMS requires the subscriber station to wake-up more often using this method, resulting in additional battery power being consumed, and such an emergency broadcast occurs at a low bit rate.

Accordingly, broadcast-multicast services (BCMCS) provides point-to-multipoint communication service in a wireless communication system 100 to a plurality of subscriber stations 106 that receive the broadcast data through a wireless communication medium. The terms "broadcast communication" or "point-to-multipoint (PTM) communication" are used herein to refer to a communication over a common communication channel to a plurality of subscriber stations 106.

Various wireless communication standards exist, such as the 3rd Generation Partnership Project 2 (3GPP2) which is an agreement established in December 1998 and represents the standardization group for code division multiple access 2000 (CDMA2000), which is the set of 3G standards based on earlier 2G CDMA technology. Furthermore, the Third Generation Partnership Project (3GPP) specifies standards for W-CDMA (UMTS), which is another 3G technology. Existing GSM and UMTS cellular networks offer multimedia broadcast-multicast service (MBMS) which includes multicast distribution links instead of point-to-point links for each end subscriber station.

The MBMS feature is split into two services: the MBMS Bearer Service and the MBMS User Service. The MBMS Bearer Service includes both a multicast and a broadcast mode, wherein IP multicast addresses are used for the IP flows. The MBMS Bearer Service, in contrast to the legacy UMTS bearer services (interactive, streaming, etc.), provides shared transmission resources in the core and radio network. The MBMS User Service is basically a MBMS Service Layer offering a streaming and download delivery method. The Streaming Delivery method can be used for continuous transmissions like mobile TV services, while the download delivery method is intended for "download and play" services.

Furthermore, MediaFLO™ is a technology or service developed by Qualcomm, Inc., the assignee herein, which is used to broadcast data to subscriber stations. Broadcast data may include video and audio streams, individual video and audio "clips", as well as information such as sports scores, stock market quotes and weather reports. The "F-L-O" in MediaFLO™ stands for "Forward Link Only." This means that data is transmitted on a forward link (FL) only or a one-way path from the base station to the subscriber station. The MediaFLO™ system transmits data on a separate frequency separate from the frequencies used by current wireless networks, which in the United States is 700 Mhz.

As stated above, wireless communication system 100 includes various channels in the forward link (FL) and the reverse link (RL). The term "logical channel" is used herein to refer to an information stream dedicated to the transfer of a specific type of information or for providing a radio interface. Logical channels relate to the information being transmitted. A logical channel can be defined by the type of information being transferred, for example, signaling information or user data information, and can be understood as different tasks the network and terminal should perform at different points in time. Logical channels are mapped into transport channels performing actual information transfer between the subscriber station domain and the access domain. Information is passed via logical channels that are mapped through transport channels which are mapped to physical channels.

As stated, FIG. 3 illustrates "n" control channels (CC) 201-212 in each of two consecutive wake-up paging cycles 214, 215 of a paging channel 200 at the subscriber station 106. Also, "n" is defined as emergency broadcast-multicast service logical channels 230 in a slot 218 for an emergency broadcast service. Thus, the subscriber station 106 wakes up once (e.g., control channel (CC) 201) every cycle (e.g., cycle 214) of n control channels (CC) 201-212 to check messages, where n=12 and a control channel (CC) (e.g., control channel (CC) 201) is divided into 256 (two hundred fifty-six) slots 216, 218, 220. In addition, one of the 256 slots in each control channel (CC) may contain an emergency broadcast-multicast logical channel 230 in slot 218 to be used for emergency broadcast service. Such a configuration and method results in virtually no impact to the power or battery life of the subscriber station, because the subscriber station does not need to wake-up any more frequently for this service since the subscriber station is already awake checking for pages in the subscriber station's assigned control channel (CC) (e.g., control channel (CC) 201). As illustrated in FIG. 3, the pages are unicast and there is minimal effect on system capacity because normally, there is no content sent on these logical broadcast channels.

In FIG. 3, there are twelve control channels (CC) 201-212 each containing 256 slots 216, 218 and 220. Thus, twelve mobiles may be serviced in a different control channel (CC). The channels may be synchronous control channels. In CDMA 1×EV-DO rev A, synchronous control channels may use a data rate of 38.4 or 76.8 kbps with a payload of 1024 bits. They may contain more than one control channel packets or payloads. Thus, the subscriber station may wake-up every 12*256 slots=3072 slots to check unicast messages. If each slot is equal to 1.67 msec., the mobile may wake-up every 5.12 seconds.

Figure 4A:
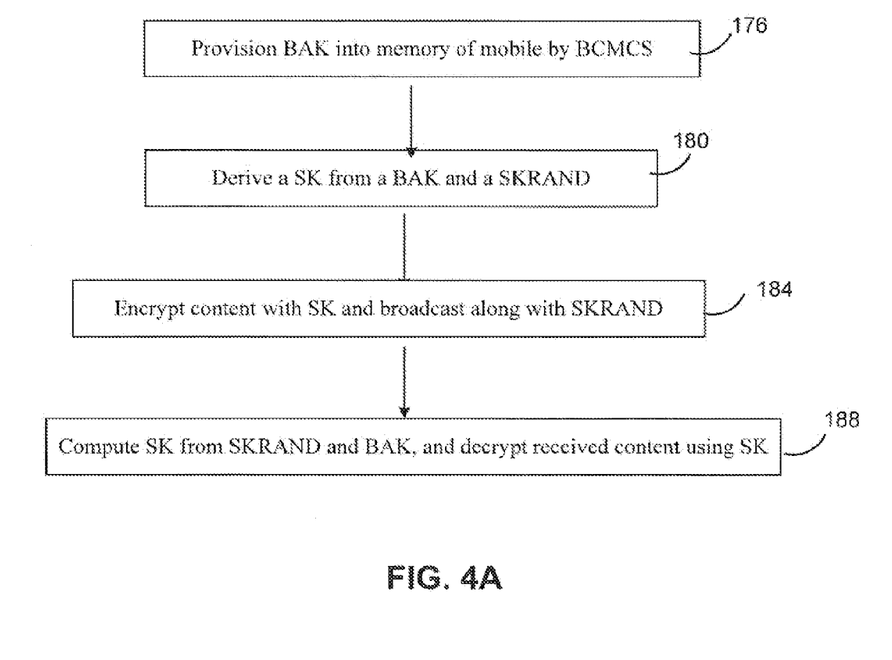
FIG. 4A is a flowchart of the steps executed by a broadcast-multicast service using encryption keys, in accordance with an embodiment of the present invention.
Figure 4B:
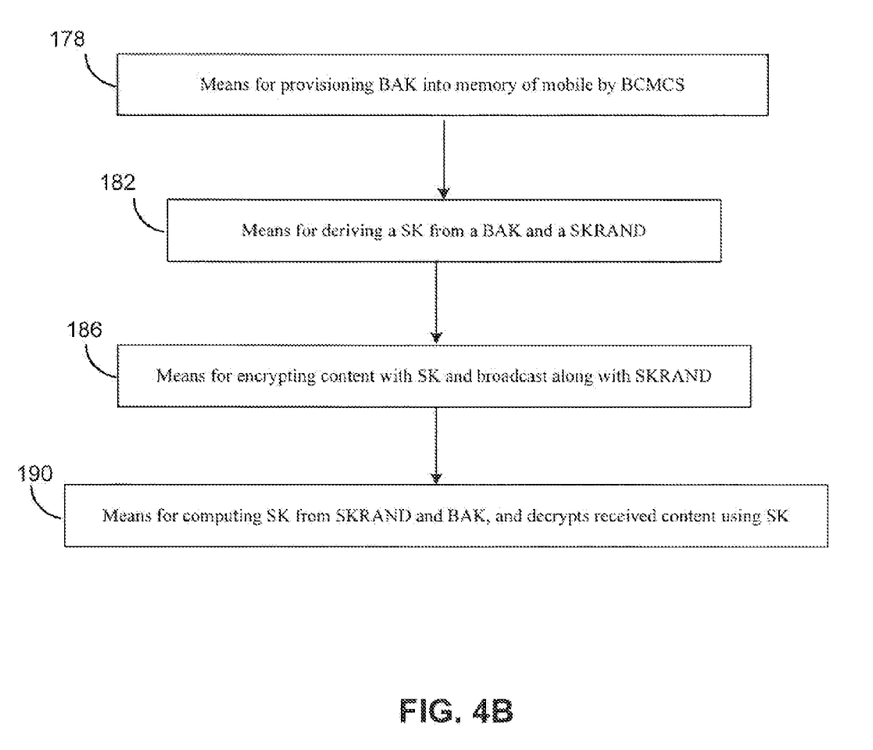
FIG. 4B is a block diagram comprising means plus function blocks used by a broadcast-multicast service using encryption keys, in accordance with an embodiment of the present invention.

FIGS. 4A and 4B illustrate a method and means for securing subscription content, in accordance with an embodiment of the present invention. The broadcast content is typically encrypted and decrypted through several levels of encryption and decryption to provide at least some level of assurance that unauthorized users will not be able to decrypt the content to which they are not entitled (i.e., content that is not subscribed to by the user of the subscriber station 106). To enable the encryption and decryption of the broadcast content, the broadcast-multicast service employs the use of encryption keys.

A long-term encryption key, commonly referred to as a broadcast access key (BAK), is provisioned 176 by a means 178 into the memory 416 (FIG. 2) of the subscriber station 106 by the broadcast-multicast service. A short-term key (SK) is derived 180 by a means 182 from the broadcast access key BAK and a random number SKRAND. The content is encrypted 184 by a means 186 with the short-term key SK, and is broadcast 184 by a means 186 over the air to the subscriber station 106 by the wireless communication system 100 along with the random number SKRAND. The subscriber station 106 computes 188 by a means 190 the short-term key SK from the random number SKRAND and the broadcast access key BAK, and decrypts 188 by a means 190 the received content using the short-term key SK for presentation of the content to the user of subscriber station.

As an alternative to emergency broadcasting using SMS, the various embodiments of the present invention provide methods and apparatus for using a broadcast-multicast service to send broadcast information to mobiles by using a paging service. Examples of broadcast-multicast services include the multimedia multicast broadcast service (MMBS) developed by 3GPP (Third Generation Partnership Project), the broadcast-multicast service (BCMCS) service, Media-FLO™, or the emergency broadcast-multicast service (EBC-MCS) service developed by 3GPP2 (Third Generation Partnership Project 2) which are capable of sending broadcast information to subscriber stations.

The various embodiments provide improvements by conserving power in the subscriber station as the presence of the service signal is minimized. Generally, wireless communication is generally intermittent, namely, information exchange occurs in bursts. To conserve energy, a subscriber station enters a sleep state whereby energy consumption is reduced by disabling communication.

Figure 5A:
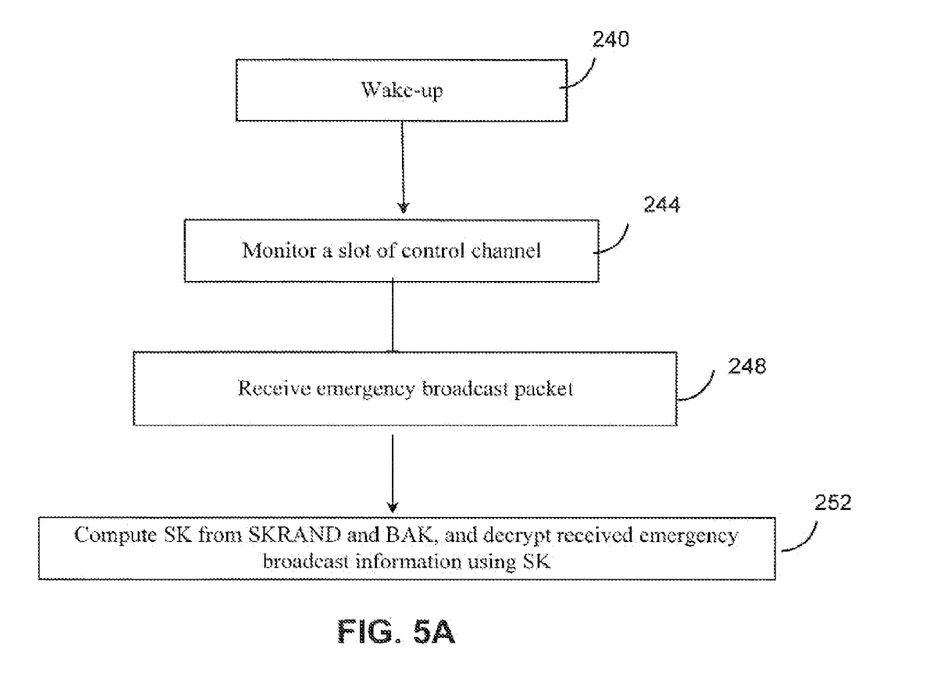
FIG. 5A is a flowchart comprising the steps of a method used to generate an emergency broadcast service, in accordance with an embodiment of the present invention.
Figure 5B:
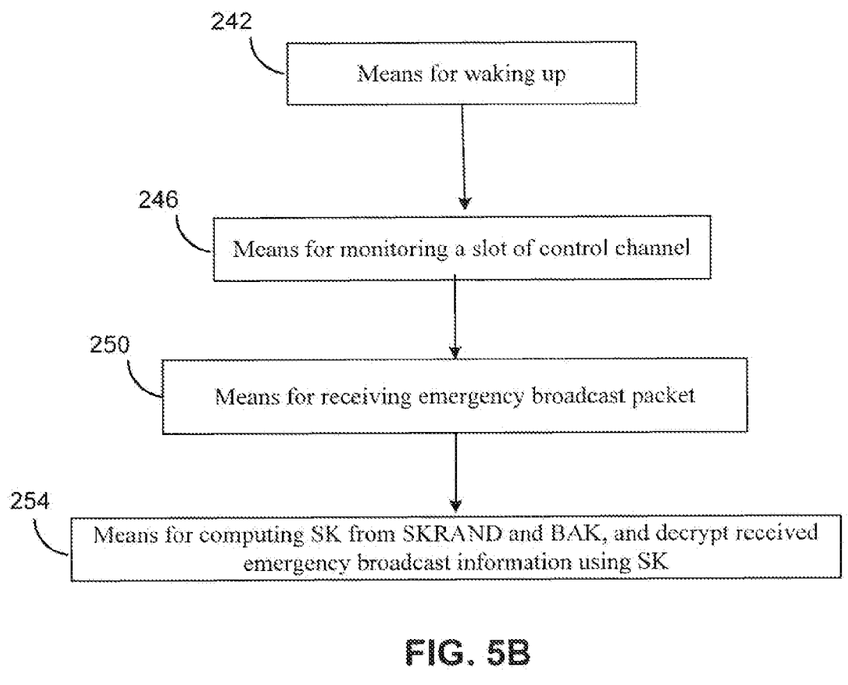
FIG. 5B is a block diagram comprising means plus function blocks used to generate an emergency broadcast service, in accordance with an embodiment of the present invention.

FIGS. 5A and 5B illustrate a method and means for implementing an emergency broadcast in a BCMCS service, in accordance with embodiments of the present invention. The subscriber station periodically wakes-up 240 by means 242 to check if any receive pages are addressed to the subscriber station. In a wake-up state, a subscriber station monitors 244 by means 246 one or more assigned time slots. During this monitoring period, the subscriber station's circuitry is fully enabled which requires power to operate, thereby reducing the battery life. In digital wireless networks, and EV-DO networks in particular, paging channels are logical control channels that allow the devices to receive 248 by means 250 the control messages. In addition, the channels may be slotted, as known by those of ordinary skill in the art. The subscriber station 106 computes 252 by a means 254 the short-term key SK from the random number SKRAND and the broadcast access key BAK, and decrypts 252 by a means 254 the received emergency broadcast information using the short-term key SK for presentation of the emergency broadcast information to the user of subscriber station.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray™ disc where disks usually reproduce data magnetically, while discs reproduce data optically with lasers. Combinations of the above should also be included within the scope of computer-readable media.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof, designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for receiving emergency broadcast information at a subscriber station, comprising:
periodically waking up from a sleep state to check a paging channel during at least one control channel cycle of a broadcast service;
checking the paging channel, during a first set of one or more time slots of the control channel cycle and during the wake-up, for unicast information;
checking the paging channel, during a second set of one or more time slots of the control channel cycle and during the wake-up, for emergency broadcast information, wherein the second set of time slots is adjacent in time to the first set of time slots;
receiving the emergency broadcast information on the paging channel in the second set of time slots of the control channel cycle, before reentering the sleep mode, wherein the emergency broadcast information is received from the same network that is checked for the unicast information;
computing a short-term key from a pseudo-random number and a broadcast access key; and
decrypting the received emergency broadcast information using the short-term key.

2. The method of claim 1, wherein the broadcast service is a multimedia multicast broadcast service.

3. The method of claim 1, wherein the broadcast service is a broadcast-multicast service.

4. The method of claim 1, wherein the broadcast service is a MediaFlo service.

5. The method of claim 1, wherein the broadcast service is an emergency broadcast-multicast service.

6. The method of claim 1, further comprising presenting the emergency broadcast information to a user.

7. The method of claim 6, wherein presenting further comprises decrypting the broadcast information.

8. The method of claim 1, wherein the control channel cycle is part of a paging cycle in the broadcast service.

9. The method of claim 1, wherein the unicast information is a unicast paging message for the subscriber station.

10. The method of claim 1, wherein the first set of slots are sync control channel slots and the second set of slots are emergency broadcast slots.

11. The method of claim 1, wherein the periodical waking occurs at a period of 3072 slots.

12. The method of claim 1, wherein the periodical waking occurs at a period of 5.12 seconds.

13. An apparatus for receiving emergency broadcast information at a subscriber station, comprising:
means for periodically waking up from a sleep state to check a paging channel during at least one control channel cycle of a broadcast service;
means for checking the paging channel, during a first set of one or more time slots of the control channel cycle and during the wake-up, for unicast information;
means for checking the paging channel, during a second set of one or more time slots of the control channel cycle and during the wake-up, for emergency broadcast information, wherein the second set of time slots is adjacent in time to the first set of time slots;
means for receiving the emergency broadcast information on the paging channel in the second set of time slots of the control channel cycle, before reentering the sleep mode, wherein the emergency broadcast information is received from the same network that is checked for the unicast information;
means for computing a short-term key from a pseudo-random number and a broadcast access key; and
means for decrypting the received emergency broadcast information using the short-term key.

14. The apparatus of claim 13, wherein the broadcast service is a multimedia multicast broadcast service.

15. The apparatus of claim 13, wherein the broadcast service is a broadcast-multicast service.

16. The apparatus of claim 13, wherein the broadcast service is a MediaFlo service.

17. The apparatus of claim 13, wherein the broadcast service is an emergency broadcast-multicast service.

18. An apparatus, comprising:
a memory; and
a processor coupled to the memory, and configured to perform a process including: periodically waking up from a sleep state to check a paging channel during at least one control channel cycle of a broadcast service;
checking the paging channel, during a first set of one or more time slots of the control channel cycle and during the wake-up, for unicast information;
checking the paging channel, during a second set of one or more time slots of the control channel cycle and during the wake-up, for emergency broadcast information, wherein the second set of time slots is adjacent in time to the first set of time slots;
receiving the emergency broadcast information on the paging channel in the second set of time slots of the control channel cycle, before reentering the sleep mode, wherein the emergency broadcast information is received from the same network that is checked for the unicast information;
computing a short-term key from a pseudo-random number and a broadcast access key; and
decrypting the received emergency broadcast information using the short-term key.

19. A non-transitory computer-readable medium, comprising instructions stored thereon that, if executed by a processor, cause the processor to execute a method comprising:
periodically waking up from a sleep state to check a paging channel during at least one control channel cycle of a broadcast service;
checking the paging channel, during a first set of one or more time slots of the control channel cycle and during the wake-up, for unicast information;
checking the paging channel, during a second set of one or more time slots of the control channel cycle and during the wake-up, for emergency broadcast information, wherein the second set of time slots is adjacent in time to the first set of time slots;
receiving the emergency broadcast information on the paging channel in the second set of time slots of the control channel cycle, before reentering the sleep mode, wherein the emergency broadcast information is received from the same network that is checked for the unicast information;
computing a short-term key from a pseudo-random number and a broadcast access key; and
decrypting the received emergency broadcast information using the short-term key.

20. The non-transitory computer-readable medium of claim 19, wherein the control channel cycle is part of a paging cycle in the broadcast service.

21. The non-transitory computer-readable medium of claim 19, wherein the computer-executable instructions for performing the step of receiving further comprises computer-executable instructions for performing the step of decrypting the emergency broadcast information.

* * * * *